June 8, 1954 O. D. GRANDSTAFF 2,680,784
RINGING CURRENT REPEATER
Filed Jan. 16, 1951
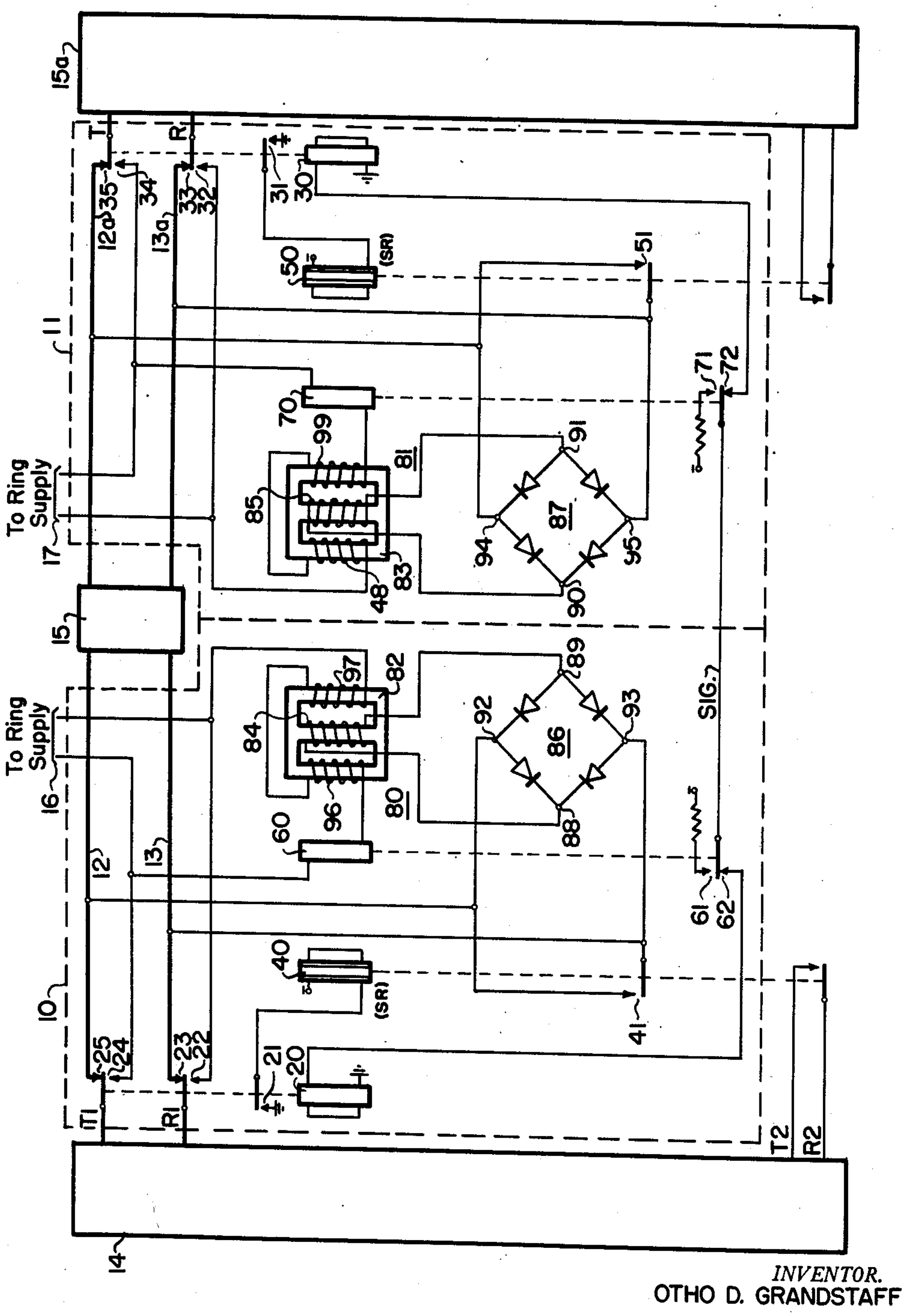
INVENTOR.
OTHO D. GRANDSTAFF
BY
Chas. Tee. Candy.
ATTORNEY Patented June 8, 1954

2,680,784

UNITED STATES PATENT OFFICE 2,680,784

RINGING CURRENT REPEATER

Otho D. Grandstaff, Oak Park, Ill., assignor to Automatic Electric Laboratories, Inc., Chicago, Ill., a corporation of Delaware Application January 16, 1951, Serial No. 206,275

4 Claims. (Cl. 179—84)

The present invention relates in general to ringing current repeaters, and more particularly to ringing current repeaters utilizing impedance varying devices such as magnetic amplifiers.

In ringing current repeaters for toll telephone circuits, the sensitivity of the ringing repeater to incoming ringing signals is dependent upon the sensitivity of the receiving relay. To obtain the sensitivity required for a long toll circuit, it is necessary to use an expensive relay with a delicate adjustment. Such a relay is affected by vibration, dust and drift of adjustment, requiring frequent cleaning and readjustment.

Accordingly, an important object of the present invention is to provide a ringing current repeater wherein the receiving relay can be a sturdy relay of a standard type with good contact pressure thereby resulting in reliable operation with little maintenance.

Another object of the present invention is to provide a ringing current repeater utilizing magnetic amplifying means, whereby a minimum amount of equipment is required.

Another object of the present invention is to provide a ringing current repeater utilizing a magnetic amplifier thereby providing a durable and dependable system.

The above objects and others not specifically mentioned will be apparent from the detailed description which together with the drawing constitutes a preferred embodiment of the invention.

The enclosed drawing shows a schematic diagram of the ringing current repeater embodying the present invention.

A ringing current repeater is a device for receiving ringing current signals from a telephone circuit such as a toll circuit and for sending ringing current signals out on the toll telephone circuit. The ringing current repeaters may be used at toll circuit terminals to signal toll boards where a ring-down toll board is involved. Ringing current repeaters when connected back-to-back for two-way transmission may be used to repeat ringing around a voice frequency repeater at an intermediate point in a toll circuit and therefore may be used effectively to receive weak incoming signals and to transmit signals with a desired strength.

As shown in the drawing, two similar ringing current repeaters, 10 and 11, which may be called half ringers, are connected back-to-back for two-way transmission thereby enabling incoming ringing current to be repeated. It is to be understood that a single repeater may be used singularly for direct current ringing control.

Suitable ringing signal conductors, 12 and 13, are herein provided having connected thereto at the incoming signal end suitable means such as a conventional type trunk circuit 14. A non-ringthrough repeating coil or voice frequency repeater 15, which may be of the type disclosed in now pending application for "Voice Current Repeater," Serial No. 96,052, filed May 28, 1949, by the present inventor, is connected between the ringing current repeaters 10 and 11, and is effective for preventing ringing current from being received by both repeaters 10 and 11 simultaneously. At the outgoing end of the conductors 12*a* and 13*a* suitable means such as a conventional type trunk circuit 15*a* is herein provided.

The ringing current repeaters 10 and 11 include a suitable ringing current supply such as ringing current generators 16 and 17. For connecting the ringing current generators 16 and 17 to the conductors 12, 13 and 12*a*, 13*a* respectively, suitable means such as ringing relays 20 and 30 are herein provided. The ringing current repeaters further include slow-to-release relays 40 and 50, which are of the conventional type, and also standard type alternating current receiving relays 60 and 70.

In accordance with the invention, impedance varying devices, such as magnetic amplifiers 80 and 81, are connected across the conductors 12, 13 and 12*a*, 13*a* respectively, for receiving incoming ringing current signals. The magnetic amplifiers 80 and 81 include a conventional type three-legged saturable reactor cores 82 and 83. Upon the center legs of the reactor cores 82 and 83 are wound direct current saturating windings 84 and 85. The saturating windings 84 and 85 are connected to the output of the bridge rectifiers 86 and 87 at junctions 88, 89 and 90, 91, respectively.

At opposite junctions 92, 93; 94, 95, the bridge rectifiers 86 and 87 are connected across the conductors 12 and 13 and 12*a* and 13*a*, respectively, for receiving and rectifying the ringing current signals to provide D.-C. saturating currents to the saturable reactor cores 82 and 83 through the saturating windings 84 and 85.

The saturable reactor cores 82 and 83 have on the outer legs thereof alternating current operating windings 96, 97; 48, 99, respectively. Each pair of control windings 96, 97; 48, 99 are serially connected, and in series therewith are connected the receiving relays 60 and 70, respectively. Connected thereto are the ringing current generators 16 and 17, respectively.

With no saturating current flowing through the saturating windings, the output windings provide a high impedance to prevent the receiving relay from operating. However, when current flows through the saturating winding, the permeability of the saturable core is varied thereby lowering the effective impedance of the operating windings. The lowering of the impedance of the operating windings permits the ringing current generator to energize the receiving relay.

*Operation of the ringing current repeaters*

Incoming ringing current is received over conductors 12 and 13 from the incoming trunk circuit 14 and is received therefrom by the bridge rectifier 86 at junctions 92 and 93. Suitable means such as a non-through repeater coil or a voice frequency repeater prevent both magnetic amplifiers from receiving the ringing current simultaneously. The ringing current is rectified by the bridge rectifier 86 and the rectified ringing current then flows through the saturating winding 84. The impedance of the output windings 96 and 97 is lowered in a manner previously described and thus permitting the receiving relay 60 to be energized over the following path: ringing generator 16, relay 60, winding 96, winding 97 and back to generator 16.

Contacts 61 close by the operation of relay 60 to complete a circuit to the ringing relay 30 of repeater 11 over the following path: battery, contacts 61, contacts 72, relay 30 and ground.

For impressing ringing current across the conductors 12*a* and 13*a* for signalling the trunk circuit 15*a*, relay 30 closes contacts 32 and 34. Contacts 35 and 33 break thereby preventing ringing signals from being returned to the incoming trunk circuit 14. Contacts 31 make to operate relay 50 over an obvious path.

Slow-to-release relay 50 operates to close contacts 51 for short circuiting the bridge rectifier 87 after relay 30 releases, thereby dissipating the ringing current signal remaining on conductors 12*a* and 13*a* to prevent false operations.

For ringing in the opposite direction, the signal is transmitted from the trunk circuit 15*a* and repeated to the trunk line circuit 14 in a manner similar to that previously described for the incoming ringing signal.

It is to be understood that modifications and variations may be effected without departing from the scope of the appended claims.

I claim:

1. A ringing current repeater adapted for use in telephone systems comprising a pair of conductors having an incoming ringing current received thereover, an alternating current relay, a ringing current source, a signal circuit completed in response to the operation of said alternating current relay for providing an outgoing ringing signal, a magnetic amplifier with a plurality of windings and saturable cores, rectifying means energized by the incoming ringing current for saturably controlling said magnetic amplifier, said magnetic amplifier effectively controlling the amount of power passing through it from said ringing current source for the operation of said relay.

2. A ringing current repeater adapted for use in telephone systems comprising a pair of conductors having an incoming ringing current received thereover, a relay, a signal circuit completed in response to the operation of said relay, a saturable core reactor having an operating winding thereon serially connected to said relay, a rectifier circuit connected to said conductors, a magnetizing winding on said saturable core reactor, said rectifier circuit responsive to the incoming ringing current for energizing said magnetizing winding whereby the impedance of said operating winding is decreased, and means for energizing said relay in response to the decrease of impedance of said operating winding.

3. A two-way ringing current repeater adapted for use in two-way transmission systems comprising a first pair of conductors having incoming ringing current received thereover, a first impedance varying device, a ringing current source, said first impedance varying device connected to said ringing current source, rectifying means connected to said first pair of conductors and responsive to the incoming ringing current for saturating said first impedance varying device, a first relay connected to said first impedance varying device, circuit means operating said first relay in response to partial saturation of said first impedance varying device, a second pair of conductors, a ringing circuit completed in response to the operation of said first relay for transmitting outgoing ringing current from said ringing source over said second pair of conductors, a second impedance varying device, a second ringing current source, said second impedance varying device connected to said second ringing current source, rectifying means connected to said second pair of conductors and responsive to the incoming ringing current for saturating said second impedance varying device, a second relay connected to said second impedance varying device, circuit means operating said second relay in response to partial saturation of said second impedance varying device, and a ringing circuit completed in response to the operation of said second relay for transmitting outgoing ringing current from said second ringing source over said first pair of conductors.

4. A ringing current repeater adapted for use in telephone systems comprising a pair of conductors, having ringing current received thereover, a plurality of impedance varying devices interconnected together, a local power source, a relay connected in a circuit including one of said impedance varying devices and said local power source, another of said impedance varying devices responsive to said received ringing current for varying the impedance of one of said impedance varying devices, said relay operated over said circuit in response to the variation of impedance of said one of said impedance varying device, and a signal circuit completed in response to the operation of said relay to provide an outgoing ringing signal.

References Cited in the file of this patent

UNITED STATES PATENTS

| Number | Name | Date |
|---|---|---|
| 1,699,774 | Bellamy | Jan. 22, 1929 |
| 1,953,487 | Knoop | Apr. 3, 1934 |
| 2,004,759 | Jester | June 11, 1935 |
| 2,164,383 | Burton | July 4, 1939 |
| 2,424,594 | Theillaumas | July 29, 1947 |
| 2,452,239 | Huge | Oct. 26, 1948 |